(12) United States Patent
Ham

(10) Patent No.: US 10,049,065 B2
(45) Date of Patent: Aug. 14, 2018

(54) DATA TRANSMISSION AND RECEPTION SYSTEM

(71) Applicant: LSIS CO., LTD., Anyang-si, Gyeonggi-do (KR)

(72) Inventor: Sung Sik Ham, Cheongju-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 154 days.

(21) Appl. No.: 15/067,848

(22) Filed: Mar. 11, 2016

(65) Prior Publication Data

US 2016/0306759 A1 Oct. 20, 2016

(30) Foreign Application Priority Data

Apr. 20, 2015 (KR) .................. 10-2015-0055320

(51) Int. Cl.
| | |
|---|---|
| G06F 3/00 | (2006.01) |
| G06F 5/00 | (2006.01) |
| G06F 13/362 | (2006.01) |
| H04L 12/40 | (2006.01) |
| H04L 12/403 | (2006.01) |
| G06F 13/40 | (2006.01) |

(52) U.S. Cl.
CPC ........ G06F 13/362 (2013.01); G06F 13/4022 (2013.01); G06F 13/4068 (2013.01); H04L 12/403 (2013.01); H04L 12/40143 (2013.01); H04L 2012/40215 (2013.01)

(58) Field of Classification Search
None
See application file for complete search history.

(56) References Cited

U.S. PATENT DOCUMENTS

| | | | |
|---|---|---|---|
| 5,968,154 A | 10/1999 | Cho | |
| 8,767,885 B2 | 7/2014 | Sampath et al. | |
| 2004/0030816 A1* | 2/2004 | Knight | G06F 13/28 710/52 |
| 2004/0139258 A1* | 7/2004 | Chambers | G06F 13/4291 710/110 |
| 2008/0228978 A1* | 9/2008 | Wei | H04L 67/322 710/244 |

(Continued)

FOREIGN PATENT DOCUMENTS

| | | |
|---|---|---|
| CN | 101261613 A | 9/2008 |
| CN | 103136142 A | 6/2013 |

(Continued)

OTHER PUBLICATIONS

European Patent Office Application Serial No. 16159942.8, Search Report dated Aug. 3, 2016, 9 pages.

(Continued)

*Primary Examiner* — Hyun Nam
(74) *Attorney, Agent, or Firm* — K&L Gates LLP

(57) ABSTRACT

A communication system is provided. The communication system includes slave modules outputting collected data to a master module, and outputting data priority processing request information to the master module; and the master module connected to slave modules, collecting data from the slave modules, and processing, by priority, data from a corresponding slave module based on the data priority processing request information received from at least one slave module.

15 Claims, 7 Drawing Sheets

(56) References Cited

U.S. PATENT DOCUMENTS

2012/0282930 A1 11/2012 Ahluwalia
2016/0170930 A1* 6/2016 Weng .................. G06F 13/4282
710/110

FOREIGN PATENT DOCUMENTS

| EP | 2690826 | 1/2014 |
| JP | 2007-133858 | 5/2007 |
| KR | 10-1994-0018756 | 8/1994 |
| KR | 10-1999-0060526 | 7/1999 |
| KR | 10-2000-0046181 | 5/2002 |
| KR | 10-2002-0078199 | 10/2002 |
| KR | 10-2002-0093306 | 12/2002 |
| KR | 10-2003-0056567 | 7/2003 |
| KR | 10-2003-0015165 | 1/2005 |
| KR | 10-2005-0572770 | 4/2006 |
| KR | 10-2006-0126039 | 12/2006 |
| KR | 10-2012-0136247 | 12/2012 |

OTHER PUBLICATIONS

Chinese Office Action for related Chinese Application No. 201610228772.X; dated May 2, 2018; (6 pages).

* cited by examiner

DATA TRANSMISSION AND RECEPTION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0055320, filed on Apr. 20, 2015, the contents of which are all hereby incorporated by reference herein in its entirety.

BACKGROUND

The present disclosure relates to a data transmission and reception system.

Generally, large controller systems or devices are implemented as a shelf that is installed in a standard rack. Each shelf includes a backplane that has a slot for mounting a plurality of modules. That is, in the case where many types of modules that perform unique function are combined to make up a single controller system, one of methods of exchanging information among many types of modules is using a common bus technique using the backplane.

FIG. 1 is a schematic block diagram of a general backplane system.

Referring to FIG. 1, a typical backplane typically is a double-sided or single side printed circuit board (PCB) and mounts modules 10, 20, and 31 to 34 thereon, and each module is connected in common through a signal line (data bus or address bus) and a power line on the backplane.

FIGS. 2 and 3 illustrate an operation method for data transmission and reception in a typical backplane system.

Referring to FIG. 2, a data transmission bus structure which employs a serial bus mode as a backplane bus mode has a multi-drop structure in which a single master module 20 and N slave modules 31 to 33 are connected to a single data bus line, and has a communication port and a drive chipset for each module, thus reception and transmission are possible. Generally, in the backplane bus mode having the above-described structure, a master module that makes a request and only a slave module that receives the request output bus signals to the data bus line. N slave modules have unique identifiers, respectively and the master module checks the identifier of the slave module and performs sequential 1:1 communication according to a sequence preset according to a result of check.

Also, FIG. 3 is a structural diagram of a data transmission bus that employs an Ethernet mode as the backplane bus mode. The structure includes an Ethernet switch and enables bi-directional communication between the master module 20 and the slave modules 31 to 33 but needs to include an expensive switch 41, and the Ethernet mode may perform only sequential 1:1 communication between the master module and the slave module as well. 2

Thus, since a system that takes a backplane bus mode in which there is a plurality of slave modules performs a sequential data processing operation on each slave module, a data processing time corresponding to N times the data processing time of each slave module is needed for a single cycle. In this case, it is difficult to process, by priority, data from a specific module, thus inefficient data processing occurs, and there is a limit on data processing by a passive data processing operation.

SUMMARY

Embodiments provide a data transmission and reception method for active and efficient data processing between a master module and a plurality of slave modules, and a corresponding communication system.

Embodiments also provide a data transmission and reception method that may minimize energy and time consumption in data processing operation between a master module and slave modules, and a corresponding communication system.

In one embodiment, a communication system includes slave modules outputting collected data to a master module, and outputting data priority processing request information to the master module; and the master module connected to slave modules, collecting data from the slave modules, and processing, by priority, data from a corresponding slave module based on the data priority processing request information received from at least one slave module.

In another embodiment, a communication system includes a slave module outputting collected data to a master module, transmitting data priority processing request information to the master module, and outputting data to the master module according to a preset priority; and a switch unit connecting the master module and slave modules and setting a data output path according to the data priority processing request.

DETAILED DESCRIPTION OF THE EMBODIMENTS

Figure 1:
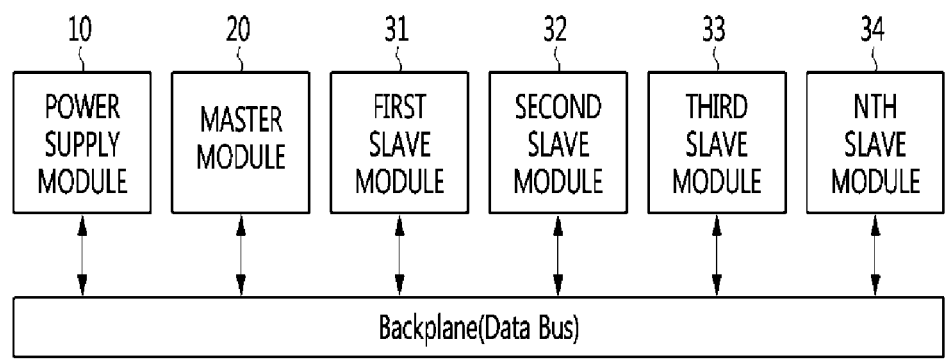
FIG. 1 is a schematic block diagram of a general backplane system.
Figure 2:
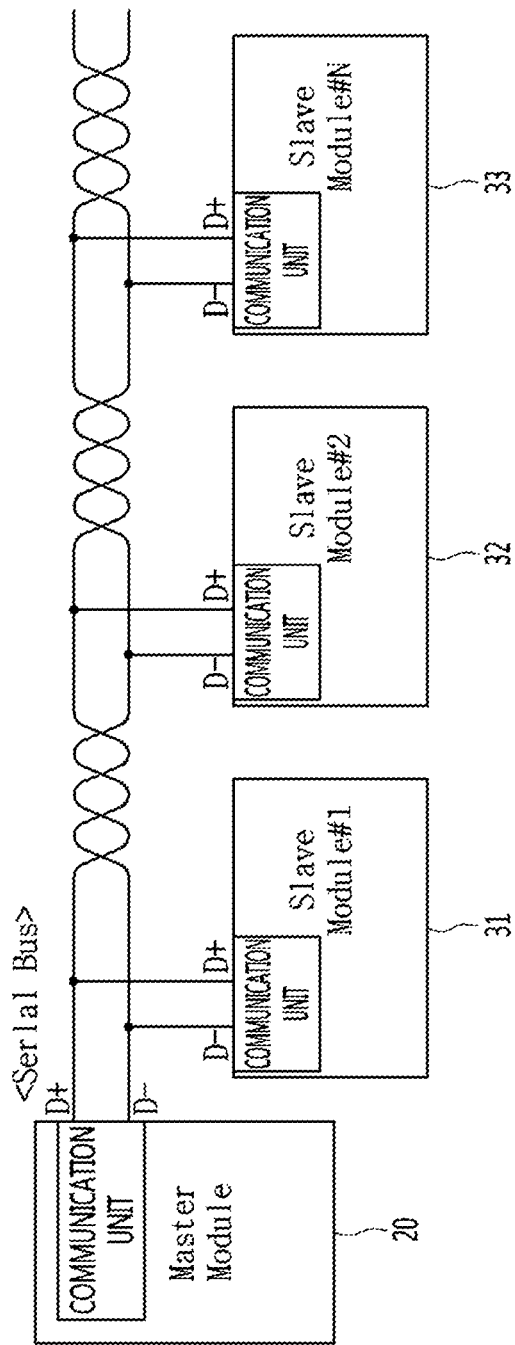
FIGS. 2 and 3 are schematic block diagrams for explaining a network configuration of a typical backplane system.
Figure 3:
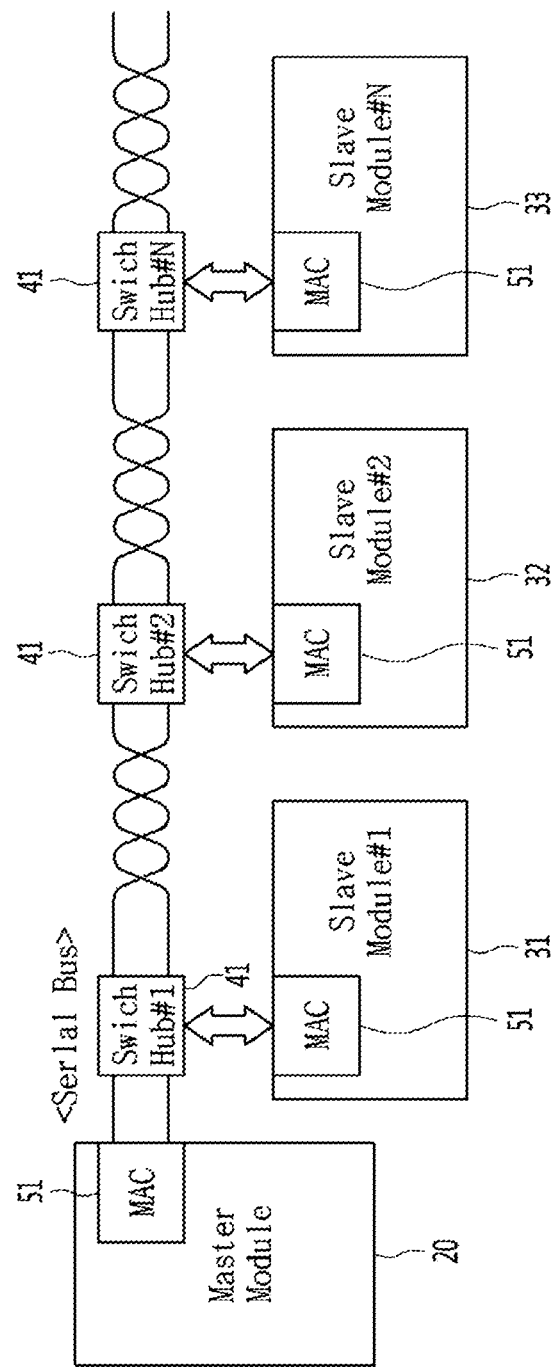

The terms or words used in the detailed description and claims should not be limitatively construed as typical meanings or meanings indicated in dictionaries but should be construed as meanings and concepts matching the technical spirit of the inventive concept based on the principle that the inventor may properly define the concepts of terms in order to describe his or her invention in the best mode.

Thus, since embodiments described in the detailed description and configurations shown in the drawings are only examples and do not cover all the technical spirits of embodiments, it should be understood that there may be various equivalents and variations that may replace them upon filing the present application.

Figure 4:
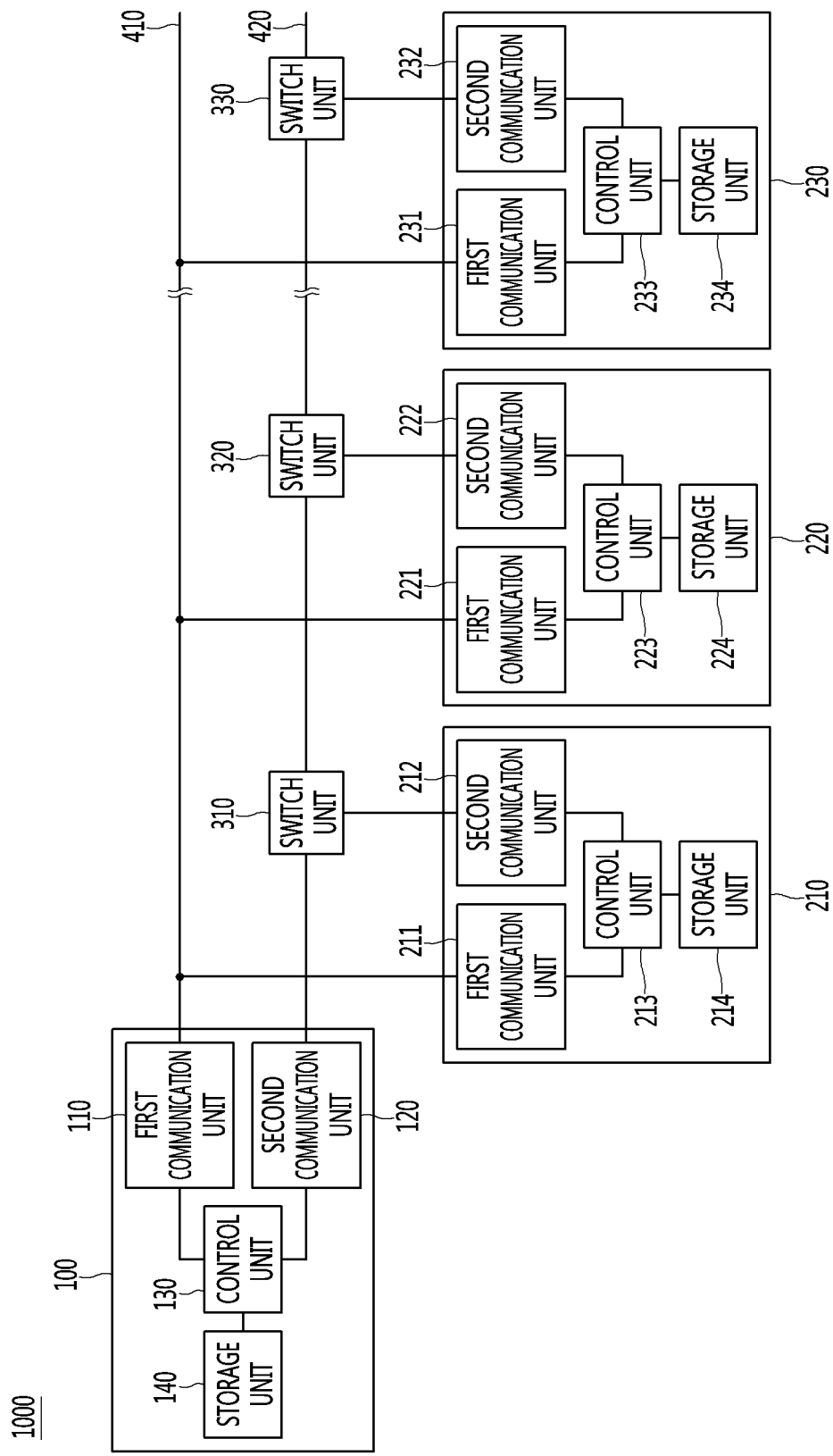
FIG. 4 is a schematic block diagram for explaining a network configuration of a data transmission and reception communication system according to an embodiment.

FIG. 4 is a schematic block diagram for explaining a network configuration of a data transmission and reception communication system according to an embodiment.

Referring to FIG. 4, a data transmission and reception communication system 1000 according to an embodiment may include a master module 100, a plurality of slave modules 210, 200, and 230, and switch units 310, 320, and 330.

The master module 100 may collect data from the slave modules 210, 220, and 230 that are connected in common, process the collected data, and output information on a result of processing. The master module may be connected to the slave modules 210, 220, and 230 through a serial bus, and receive a data collection request signal through the serial bus or perform data collection at a predetermined interval or time.

The master module 100 may include a first communication unit 110, a second communication unit 120, a control unit 130, and a storage unit 140.

The first communication unit 110 may be connected to a serial bus 410 for accessing the slave modules so that it is possible to sequentially collect data from the slave modules 210, 220, and 230 connected to the master module 100 according to a preset sequence. That is, the first communication unit 110 may request and receive data by using a round robin through the first communication unit 110 in order to obtain data from N slave modules. The first communication unit 110 may sequentially perform a data collection request based on the above technique, e.g., from the slave module nearest to the master module 100 and perform corresponding data collection.

The serial bus 410 connected to the first communication unit 110 may be connected to a corresponding communication unit of the slave modules 210, 220, and 230.

The first communication unit 110 may sequentially identify the identifiers of slave modules 210, 220, and 230 according to the sequence of slave modules that are connected to the slot of a backplane system through the serial bus 410, and collect data from a corresponding slave module.

The first communication unit 110 may include a separate drive (not shown) according to an output signal. For example, in the case where the first communication unit 110 is a transistor transistor logic (TTL), it is possible to connect a separate driver for transmitting and receiving a corresponding signal to the first communication unit 110. The communication scheme of the first communication unit 110 may be applied to various serial data bus modes that include a multi-drop bus, such as RS485/RS422, a controller area network (CAN) bus, low voltage differential signaling (LVDS). The configuration is not fixed and it is possible to include or not include the configuration according to data transmitted and received through a communication unit and a communication logic.

The second communication unit 120 may be connected to a serial bus 420 for accessing the slave modules so that it is possible to receive data priority processing request information from the slave modules 210 to 230 connected to the master module 100 or collect data for corresponding data priority processing.

The serial bus 420 connected to the second communication unit 120 may be connected to a corresponding communication unit of the slave modules 210, 220, and 230. Apart from the first serial bus 410, the second communication unit 120 may receive, from the slave modules 210, 220, and 230, an event message for a preferential data processing request, not sequential data processing, through the second serial bus 420. Also, the second communication unit 120 may collect data from a corresponding slave module through the second serial bus 420 according to the data priority processing event message received from the slave module.

The second communication unit 120 may further include a separate drive (not shown) according to an output signal. The second communication unit 120 may be an asynchronous transmission and reception communication module. Besides, it is possible to include a parallel to serial TTL signal driver and receiver.

The control unit 130 may check identifier information on the slave modules 210, 220, and 230, data and a data priority processing request signal that are received through the first communication unit 110 and the second communication unit 120, and generate a corresponding processing control signal.

The control unit 130 may request and collect data from the connected slave modules in a system through the first communication unit 110 according to a preset sequence (e.g., from the slave module nearest to the master module). In this case, the control unit 130 may receive identifier information from the slave modules 210, 220, and 230. The received identifier information is compared with pre-stored identifier information and it is possible to collect data from a corresponding slave module when the authentication of a corresponding slave module is completed.

The control unit 130 may collect and check a specific signal or data from the slave modules 210, 220, and 230 through the second communication unit 120 in dependently of communication by the first communication unit 110. The control unit 130 may receive a data priority processing request message from the slave module through the second communication unit 120, apart from the data collection operation of the first communication unit 110. When the control unit 130 checks information on a slave module that has transmitted corresponding information, and the operation performed through the first communication unit 110 is completed, the control unit may perform, by priority, data collection and processing on the slave module that has transmitted the data priority processing request message.

Also, in the case where the received data priority processing request message is in plurality, the control unit 130 may check a corresponding slave module and collect and process, by priority, data from the corresponding slave module according to a preset priority or a preset sequence.

The control unit 130 may perform data priority processing through the second communication unit 120, and return to the previous data transmission and reception sequence through the first communication unit 110. That is, when an operation corresponding to the priority processing request signal performed through the second communication unit 120 is completed, the control unit 130 may return to a normal routine in which data is collected and processed through the first communication unit 110 from the slave module that has been performed before the priority processing request signal.

The storage unit 140 may store programs for the operations of the control unit 130 and temporarily or permanently store input/output data. The storage unit 140 may store information on the slave module that is connected to a data transmission and reception system. The storage unit 140 may store priority processing information that corresponds to data priority processing information is received from the slave module. That is, the storage unit 140 may store various pieces of information, such as sequence information and priority processing sequence information for processing data from the slave module by the control unit 130.

The storage module 140 may include at least one of types of storage mediums, such as a flash memory, a hard disk type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The configuration of at least one slave module that is connected to the master module having the above-described configuration is described. The slave modules 210, 220, and 230 are modules that include functions for inputting and outputting data, and may be slave modules that have similar configurations. Thus, any one of the slave modules is described as an example. Alternatively, in the case of a slave module having a different configuration, the same configuration which is applied according to an embodiment is described.

The slave module that is connected through the first and second serial buses 410 and 420 through the first communication unit 110 and the second communication unit 120 of the master module 100 may be removably connected in a backplane system.

The slave module 210 may include a first communication unit 211, a second communication unit 212, a control unit 213, and a storage unit 214.

The first communication unit 211 may connect the first serial bus 410 to the master module 100 to sequentially transmit data according to a preset sequence. The first communication unit 211 may transmit, to the master module 100, data collected based on the control of the master module 100, through the first serial bus connected to the first communication unit 211.

The first communication unit 211 may transmit identifier information to the master module 100, and output data collected at a corresponding time to the master module 100 based on the control signal that is applied from the master module 100.

Since the first communication unit 211 is connected to the first communication unit 210 of the master module 100 and collects data sequentially from the slave module nearest to the master module 100 by using a round robin, it is possible to output data to the master module 100 through the first communication unit 210 according to a corresponding order (sequence).

The second communication unit 212 may be connected to the second communication unit 120 of the master module.

In the case where there is priority processing data independently of the operation of the first communication unit 211, the second communication unit 212 may transmit, to the master module 100, an event message that include a data priority processing request signal. Also, the second communication unit 212 may output data to be processed by priority to the master module 100 based on the data priority processing request event message that is transmitted to the master module 100.

The event message that includes the data priority processing request signal transmitted to through the second communication unit 212 may have the following data structure.

Preamble

Character ID Character Data Error Detect Character

The event message may include ID character, data and error detect character for a corresponding slave module. Additionally, Preamble character may include content that provides a notification of event message information. Also, the event message may include information on a data format, a data size, a data type, and the like, and a data processing priority may be determined based on the information. The configuration of the message may vary according to a communication system or communication scheme.

The control unit 213 may check information on the data that the slave module collects. The control unit 213 may output, to the master module 100, the data collected through the first and second communication units 211 and 212 based on the control of the master module 100 according to a corresponding order (sequence). When data requiring priority processing is sensed from the data that the slave module collects, the control unit 213 may generate an event message that includes a priority processing request signal, and enable a corresponding message to be output to the master module 100 through the second communication unit 212. Also, the control unit 213 may generate a read to send (RTS) signal, and enable a switch unit 310 connected to the second communication unit 212, according to the signal.

The storage unit 214 may store the data that the slave module 210 collects. The storage unit 214 may store identifier information on the slave module 210. The storage unit 214 may store priority information or sequence information for transmitting the data from the slave module 210 to the master module 100.

The storage module 214 may include at least one of types of storage mediums, such as a flash memory, a hard disk type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

When the second communication unit 212 needs to be connected to the master module 100, it may be connected to the master module through the switch unit 310.

The switch unit 310 is to transmit a data priority processing request event message from a corresponding slave module 210 or connect data transmission and reception paths between neighboring slave modules and may be enabled by the RTS signal of the second communication unit 212 or by a preamble character signal that is included in the event message.

The switch unit 310 may be connected between the second communication unit 120 of the master module 110 and the respective second communication units 212, 222, and 232 of the slave modules 210, 220, and 230.

The switching unit 310 may be provided to correspond to the slave module.

Figure 5:
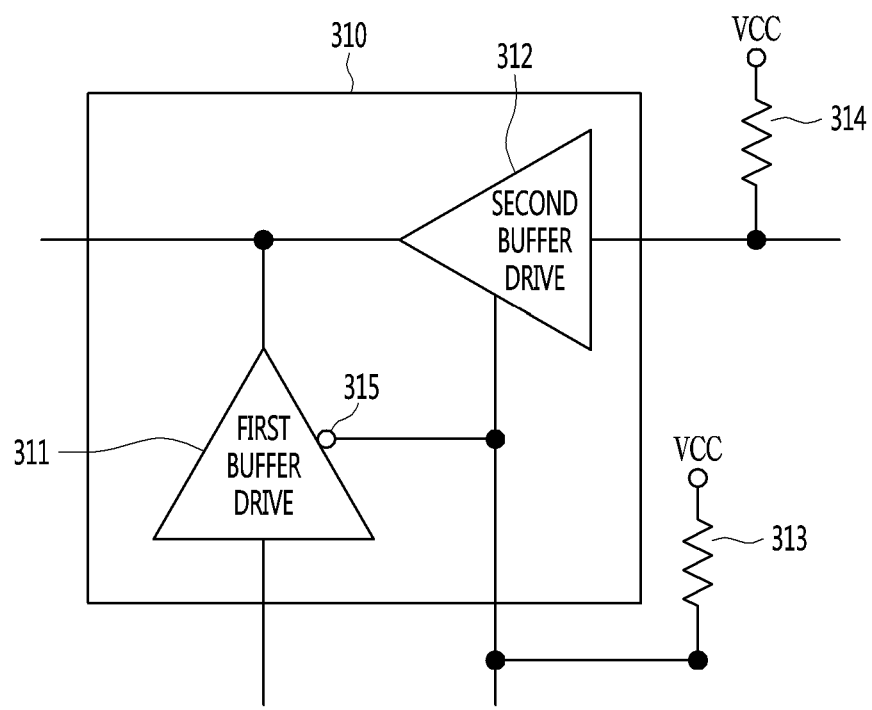
FIG. 5 is a block diagram of a switch unit according to an embodiment.

FIG. 5 is a block diagram of a switch unit according to an embodiment.

Referring to FIG. 5, the switch unit 310 may include a first buffer drive 311 and a second buffer drive 312.

The first buffer drive 311 and the second buffer drive 312 may exclusively operate.

The first buffer drive 311 may transmit a data priority processing request event message from the slave module 210 to which a corresponding switch unit 310 is connected, or provide a path for outputting data to be processed by priority. That is, the first buffer drive 311 may provide a path for transmitting an event message to the master module when the data to be processed by priority is generated from a corresponding slave module 210. In this case, the first buffer drive 311 may be enabled by the RTS signal that is output from the second communication unit 212 of the corresponding slave module 210.

The second buffer drive 312 may operate on the contrary to the first buffer drive 311. That is, when the first buffer drive 311 is enabled, the second buffer drive 312 may be disabled. Unlike the first buffer drive 311, the second buffer drive 312 may be enabled in order to generate a path for outputting event messages and data to be processed by priority from the slave modules 220 and 230 physically disposed after the corresponding slave module 210, not to generate a path for outputting the event messages and corresponding data from the corresponding slave module 210.

That is, in the case where the second buffer drive 312 is enabled, the first buffer drive 311 is disabled and thus may block the corresponding slave module 310 from outputting data.

Thus, before the first buffer drive 311 and the second buffer drive 312 transmit data, the first buffer drive 311 is enabled as low active and the second buffer drive 312 is disabled. Then, when the processing of data from the master module 100 and the slave module 210 that has made a priority data processing request is completed, the first buffer drive 311 is returned to the idle state and disabled and the second buffer drive 312 may be switched to an enable state.

Pull-up resistors 313 and 314 may be connected to the first drive 311 and second drive 312 of the switch unit 310, respectively.

That is, a first pull-up resistor 313 may be connected to the first buffer drive 311, and a second pull-up resistor 314 may be connected to the second buffer drive 312.

When the first pull-up resistor is in a no-load state in which the slave module is not connected, i.e., in a floating state, errors in the operations of the first buffer drive 311 and the second buffer drive 312 may occur. Thus, when there is no slave module, voltage Vcc may be connected to the buffer drive through the first and second pull-up resistors 311 and 312 to input a signal High or Low. That is, since the signal High generated by the first pull-up resistor 313 is input as a signal Low by an inverter 315 connected to the first buffer drive 311, it is possible to block the operation of the first buffer drive 311. On the contrary, since electricity may continue to flow (may be enabled) from the data line of the second buffer drive 312 by the pull-up resistor 314, it is possible to allow the communication of other slave modules even when there is no corresponding slave module.

As described above, it is possible to include the first serial bus for sequential data transmission and reception and the second serial bus for a priority data processing request and corresponding data transmission and reception between the master module and the plurality of slave modules. Also, it is possible to include the switch unit between the master module and the slave module on the second serial bus, and it is possible to perform data transmission and reception and blocking operations according to the enabling and disabling of the buffer drives in the switch unit.

In the following, data transmission and reception operations according to an embodiment and another embodiment are described in detail with reference to FIGS. 6 and 7.

Figure 6:
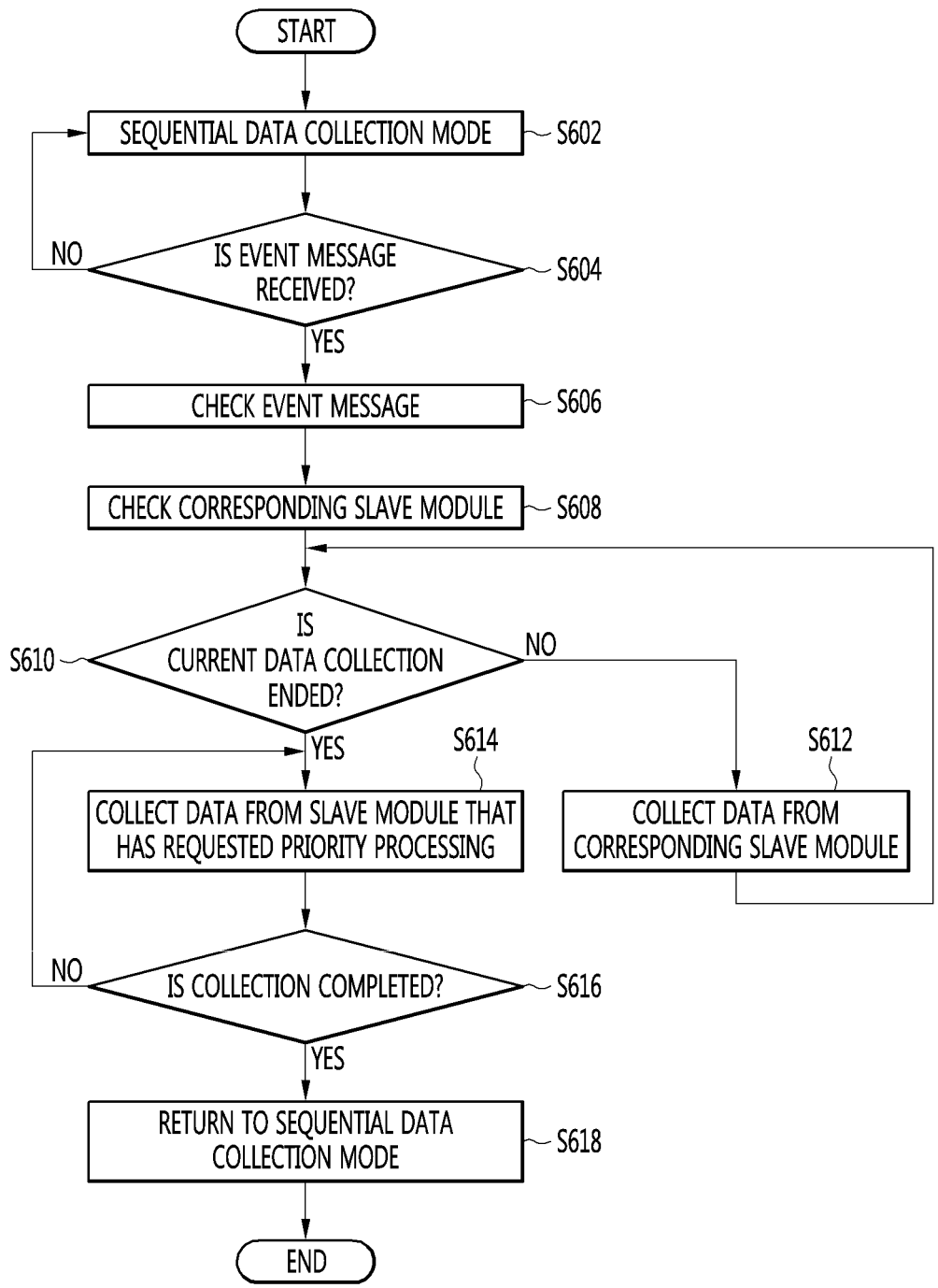
FIG. 6 is a flowchart of a data transmission and reception operation according to an embodiment.

FIG. 6 is a flowchart of a data transmission and reception operation according to an embodiment.

In an embodiment, a data transmission and reception operation of a master module is described in which a second slave module generates and transmits a data priority processing message while the master module performs communication sequentially from the first slave module nearest to the master module to an Nth slave module through a first communication unit.

A slave module that generates the data priority processing message and requests a corresponding data processing operation is not limited thereto.

Referring to FIG. 6, the control unit 130 of the master module 100 may perform a sequential data collection mode in which data is sequentially collected from slave modules 210, 220, and 230 through the first communication unit 110, in step S602.

In the sequential data collection mode, it is possible to collect data sequentially from the slave mode nearest to the master module. However, the operation is not fixed and in the embodiment, the sequence of slave modules that perform communication with the master module may vary according to a setting and priority.

The master module 100 may continue to check whether an event message is received from any one of the slave modules while performing the sequential data collection mode, in step S602. In this case, the first and second buffer drives of the switch unit that are connected to the slave modules, respectively may operate in disable and enable states.

That is, the second buffer drive of the switch unit that is connected to the slave module may maintain an enable state. Thus, a path for transmitting a data priority processing request message from the slave module to the master module by an RTS signal is generated. Since the second buffer drives of the slave modules operate in an enable state when the master module performs the sequential data collection mode, it is possible to maintain a path for transmitting an event message to all slave modules that are connected to the master module. On the contrary, since the second buffer drives operate in an enable state, the first buffer drives all may be maintained in a disable state in the sequential data collection mode of the master module.

When an event message is received from any one slave module, the master module 100 may check a corresponding event message in step S606.

The master module 100 may check the event message and check information on a corresponding slave module, in step S608.

The master module 100 may check information on the corresponding slave module and check information on data collection and processing states according to the current sequential data collection mode.

For example, in the case where the master module 100 receives an event message through the second communication unit 120 while collecting and processing data from the third slave module 230 according to the sequential data collection mode through the first communication unit 110, the master module 100 may determine whether the data collection and processing of the third module 230 have been completed, in step S610.

When the data collection and processing that are being currently performed have not been completed, the control unit 113 of the master module 100 may continue the data collection and processing of the slave module that are being currently performed, in step S612.

On the contrary, when it is confirmed that the data collection and processing of the third slave module 230 that are being currently performed have been completed, the control unit 113 of the master module 100 may perform communication with the second slave module 220 that has requested the priority processing, and perform corresponding data collection and processing.

In this case, the second buffer drive 322 of the switch unit 320 that is connected to the second slave module 220 is switched from an enable state to a disable state, and the first buffer drive 321 is switched from a disable state to an enable state so that the master module 100 may collect, through the first buffer drive 321, data output through the second communication unit 222.

The control unit 113 of the master module 100 may determine whether the data collection and processing of the second slave module 220 that has transmitted a priority processing request event message have been completed, in step S616.

When the data collection and processing of the second slave module 220 are completed, the control unit 113 of the master module 100 may return to the sequential data collection mode to perform data collection and processing from the slave module (fourth slave module) after the slave module that has performed the previous data collection, in step S618.

When returning to the sequential data collection mode of the master module 100 (when the data collection and processing of the second slave module are completed), the first buffer drive of the switch unit 320 that is connected to the second slave module 220 may shift from an enable state to a disable state and the second drive may shift from a disable state to an enable state.

Figure 7:
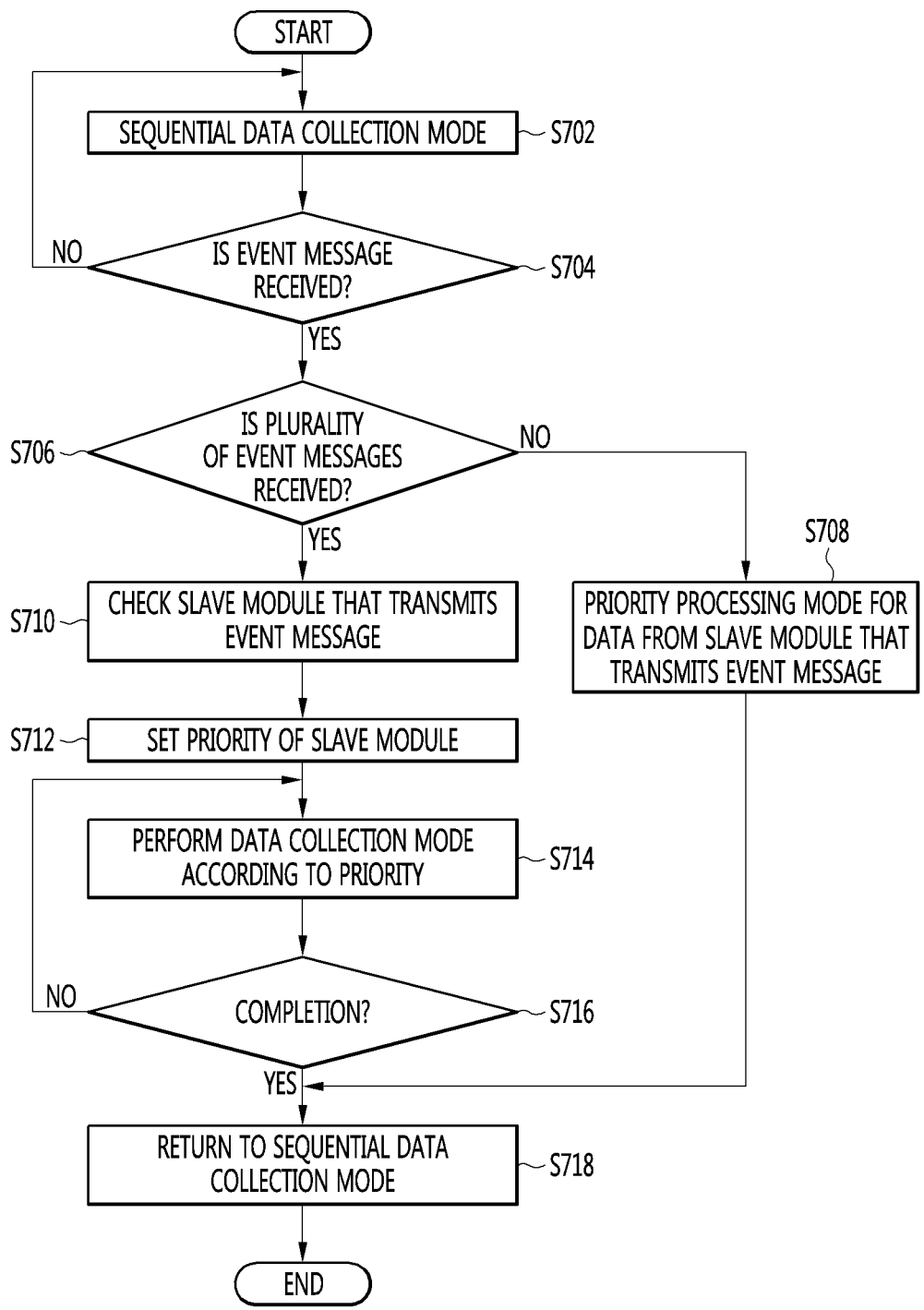
FIG. 7 is a flowchart of a data transmission and reception operation according to another embodiment.

FIG. 7 is a flowchart of a data transmission and reception operation according to another embodiment.

In another embodiment, a data transmission and reception operation of a master module is described in which second and fourth slave modules generate and transmit data priority processing messages, respectively while the master module performs communication sequentially from the first slave module nearest to the master module to an Nth slave module through a first communication unit. In the present embodiment, the descriptions of configurations corresponding to the operations in the above-described embodiment are omitted or simplified.

Referring to FIG. 7, the control unit 130 of the master module 100 may perform a sequential data collection mode in which data is sequentially collected from the slave modules 210, 220, and 230 through the first communication unit 110, in step S702.

The master module 100 may continue to check whether an event message is received from slave modules while performing the sequential data collection mode, in step S704.

When the event message is received from slave modules, the master module 100 may determine whether the received message has been received from the plurality of slave modules.

In the case where the received event message is received a single slave module, the master module 100 may perform a priority processing mode on the data from the slave module that has transmitted the event message, as described in FIG. 6.

On the contrary, when the event message is received in plurality from the slave modules, the master module 100 may check the received messages and check information on corresponding slave modules, in step S710.

That is, the master module 100 may receive, from the plurality of slave modules, an event message that includes a data priority processing request signal through the second communication unit 120, while performing the sequential data collection mode.

The master module 100 may check the received event messages and check preset priorities for the slave modules that have transmitted corresponding messages.

The priority is a priority for a slave module to perform data priority processing based on received event messages when the master module 100 receives a plurality of event messages. The priority may be a priority that is pre-stored in the storage unit 140 of the master module 100. The priority may be determined according to the sequence of the slave module nearest to the master module 100. Alternatively, the priority may be determined according to a data size, a user setting, details of data, a data type, and the like.

The master module 100 may set a data priority processing sequence according to the slave module that has transmitted an event message in step S712, and perform a data collection mode according to a priority in step S714.

In this case, it is possible to shift, from an enable state to a disable state, the second buffer drive of a switch unit that corresponds to a slave module performing data priority processing according to the priority among slave modules, and it is possible to shift the first buffer drive thereof from a disable state to an enable state. Also, when outputting data according the priority is completed, it is possible to return the states of the first and second buffer drives to the previous states.

The master module 100 may determine based on the event messages received from the plurality of slave modules whether data priority processing on each slave module has been completed, in step S716.

When the priority processing on the slave module is completed, the master module 100 may return to the sequential data collection mode to perform data collection and processing from the slave module after the slave module that has performed the previous data collection.

In this case, when the sequential data collection mode of the master module 100 is returned, the first buffer drive of a switch unit that is connected to each slave module may be in a disable state and the second buffer drive thereof may be in an enable state.

Thus, a data transmission and reception method and a corresponding communication system according to the present embodiments have effects in that a master module and slave modules that configure a system may perform mutual communication and it is possible to maximize the efficiency of corresponding data processing.

Also, the data transmission and reception method and corresponding communication system may have an effect in which it is possible to perform effective data processing because the slave module may actively transmit, to the master module, information on data on a target to be processed and the master module may correspondingly process the data on a corresponding slave module by priority.

Also, the data transmission method and corresponding communication system have an effect in that it is possible to flexibly deal with an urgent data processing situation or accident because a system including a plurality of master modules also selects a priority processing slave module and performs corresponding data processing by priority.

Also, the data transmission and reception method and corresponding communication system have an effect in that it is possible to improve the data transmission and reception bus mode between modules and correspondingly reduce time and costs.

Exemplary embodiments are mainly described above. However, they are only examples and do not limit the present disclosure. A person skilled in the art may appreciate that many variations and applications not presented above may be implemented without departing from the essential characteristic of embodiments. For example, each component specifically represented in embodiments may vary. In addition, it should be construed that differences related to such a variation and such an application are included in the scope of the present disclosure defined in the following claims.

What is claimed is:

1. A communication system comprising:
    slave modules configured to output a response signal corresponding to a request signal received from a master module, and output a data priority processing request message to the master module; and
    the master module connected to the slave modules, configured to collect data from the slave modules, and process, by priority, data from a corresponding slave module based on the data priority processing request message received from at least one of the slave modules,
wherein if two or more slave modules among the slave modules transmit the data priority processing request message to the master module, the master module collects and processes corresponding data according to the priority set for the corresponding two or more slave modules,
wherein the priority is preset by the master module or is based on information on data to be collected from the two or more slave modules.

2. The communication system according to claim 1, wherein the master module comprises:
a first communication unit transmitting the request signal to the slave modules and receiving the response signal corresponding to the request signal; and
a second communication unit connected to a second serial bus that receives the data priority processing request message from the slave modules and collects corresponding data.

3. The communication system according to claim 2, wherein each of the slave modules comprises:
a first communication unit connecting to a first serial bus that outputs data to the master module according to a preset sequence; and
a second communication unit connected to the second serial bus that outputs information for a data priority processing request and corresponding data among pieces of received data.

4. The communication system according to claim 2, wherein the master module collects data sequentially from a slave module nearest to the master module through the first communication unit.

5. The communication system according to claim 2, wherein the master module further comprises a communication drive according to a signal output through the first communication unit.

6. The communication system according to claim 5, wherein the first communication unit outputs a transistor transistor logic (TTL).

7. The communication system according to claim 1, wherein a slave module nearest to the master module has a top priority.

8. The communication system according to claim 1, further comprising switch units that correspond to the slave modules,
wherein the switch units are disposed between the slave modules and the master module.

9. The communication system according to claim 8, wherein each of the switch units comprises:
a first buffer drive setting a path for outputting a priority processing request message from a slave module corresponding to each of the switch units; and
a second buffer drive setting a path for outputting, to the master module, a priority processing request message from a slave module that does not correspond to each of the switch units.

10. The communication system according to claim 9, wherein the first buffer drive and the second buffer drive alternately operate.

11. The communication system according to claim 10, wherein the second buffer drive is enabled and the first buffer drive is disabled when the master module performs a sequential data collection mode on the corresponding slave module.

12. The communication system according to claim 10, wherein the second buffer drive transmits the data priority processing request message to the master module and shifts to a disable state, when in an enable state a data priority processing request is sensed from the slave module.

13. The communication system according to claim 12, wherein the first buffer drive shifts from the disable state to the enable state to output the priority processing request data when the second buffer drive shifts to the disable state.

14. A communication system comprising:
slave modules configured to output a response signal for a request signal received from a master module, transmit a data priority processing request message to the master module, and output data to the master module according to a preset priority;
the master module connected to the slave modules, configured to collect data from the slave modules, and process, by priority, data from a corresponding slave module based on the data priority processing request message received from at least one of the slave modules,
wherein if two or more slave modules among the slave modules transmit the data priority processing request message to the master module, the master module collects and processes the corresponding data according to the priority set for the corresponding two or more slave modules,
wherein the priority is preset by the master module or is based on information on data to be collected from the two or more slave modules; and
a switch unit connecting the master module and the slave modules and setting a data output path according to a data priority processing request.

15. The communication system according to claim 14, wherein the switch unit comprises:
a first buffer drive setting a path for outputting a priority processing request message from a slave module corresponding to the switch unit; and
a second buffer drive setting a path for outputting, to the master module, a priority processing request message from a slave module that does not correspond to the switch unit,
wherein the first buffer drive and the second buffer drive alternately operate.

* * * * *